June 10, 1952     E. E. JOHNSON ET AL     2,599,835
DIMENSIONAL TOLERANCE GAUGE
Filed Feb. 15, 1949
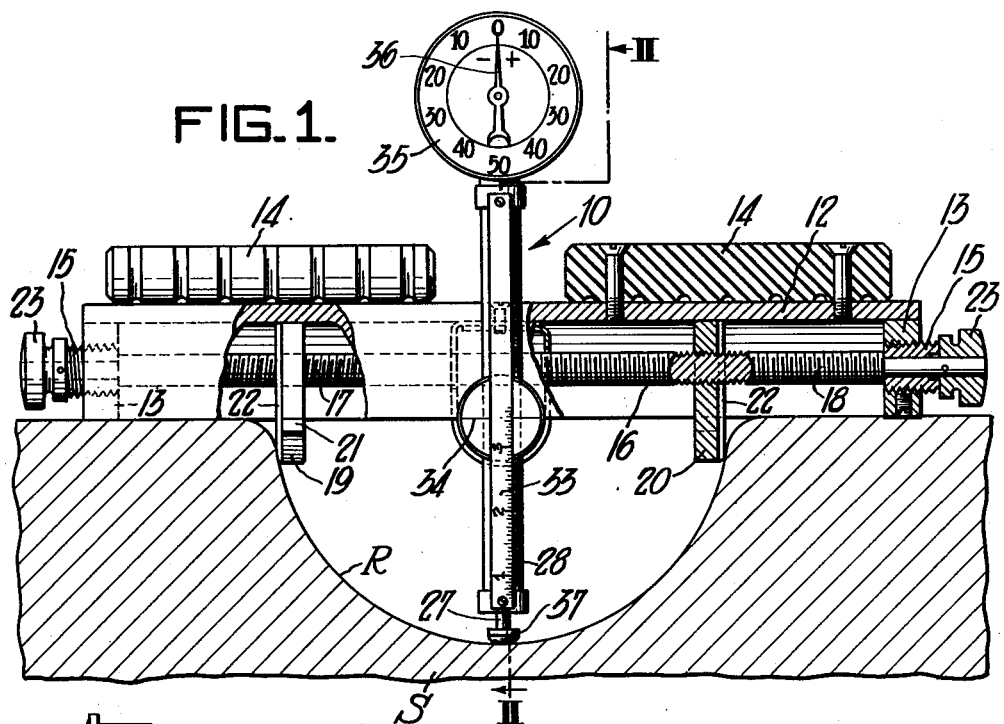
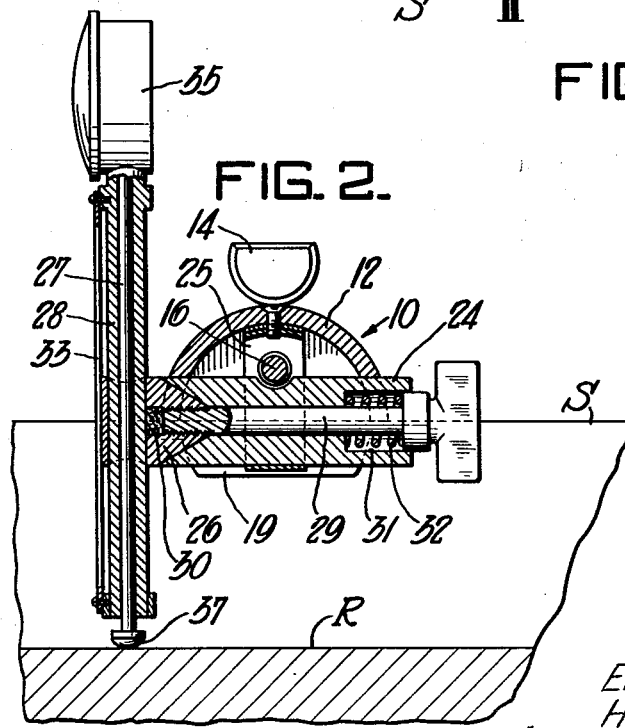
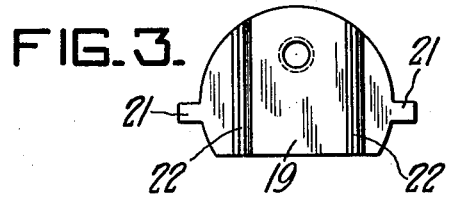
*Inventors:*
ERNEST E. JOHNSON and
HARRY A. SIEFEN,
by: Donald G. Dalton
*their Attorney.*

Patented June 10, 1952

2,599,835

UNITED STATES PATENT OFFICE 2,599,835

DIMENSIONAL TOLERANCE GAUGE

Ernest E. Johnson, McKeesport, and Harry A. Siefen, Dravosburg, Pa.

Application February 15, 1949, Serial No. 76,452

8 Claims. (Cl. 33—172)

This invention relates to gauges for checking dimensional tolerances of concave surfaces, particularly those of arcuate cross-section, such as in pipe upsetting dies.

An object of the invention is to provide improved dimensional tolerance gauges which are of simple and rugged construction and which furnish a dimensional check through substantially the whole cross-section of concave surfaces.

A further object of the invention is to provide improved dimensional tolerance gauges which are readily adjustable for checking tolerances of concave surfaces of a wide range of nominal dimensions and which furnish a very accurate measurement of variations from any nominal dimension within this range.

A further object of the invention is to provide improved dimensional tolerance gauges which comprise a mounting means adjustable to fit concave surfaces of a wide range of nominal dimensions, a gauge arm, the effective radius of which is similarly adjustable and which is pivotally carried on said mounting means for traversing the surface through substantially the whole cross-section, and a meter for indicating variations in the radius of the arm from the nominal setting.

In accomplishing these and other objects of the invention, we have provided improved details of structure, a preferred form of which is shown in the accompanying drawing, in which:

Figure 1 is a side elevational view, partly in section, showing an improved gauge which embodies features of the present invention;

Figure 2 is a vertical sectional view taken substantially on line II—II of Figure 1; and Figures 3 and 4 are side elevational and bottom plan views respectively of a preferred construction of positioning lug employed in the gauge.

In the drawing, there is shown a block S which, for example, may be one section of a pipe upsetting die and which has a concave recess R, either of uniform arcuate cross-section or else tapering longitudinally. This recess has a nominal inside radius from which there are permissible oversize and undersize tolerances. There is shown at 10 a gauge constructed in accordance with the present invention for checking these tolerances.

The gauge comprises an elongated body 12 conveniently formed from a half section of round steel pipe which has flat semi-circular end pieces 13 welded in its ends. The bottom edges of the body are flat and coplanar and the body is placed on block S wtih these edges contacting the upper face of said block. When the gauge is positioned, body 12 bridges recess R with the longitudinal axis of the body at a right angle to that of the recess. Preferably the top of the body has handles 14 to facilitate positioning the gauge.

Bushings 15 are threadedly engaged in end pieces 13 and are axially adjustable with respect to the body. A spindle 16 is journaled in said bushings and extends the full length of the body and protrudes from the end pieces. Inside the body said spindle has screw threaded sections 17 and 18 that carry left and right hand threads respectively. Positioning lugs 19 and 20 are threadedly engaged with these screw threaded sections and their edges engage closely within the body. Preferably these lugs have lateral extensions 21 that engage the bottom edges of the body, and ribs 22 for engaging the surface of recess R to furnish point contacts therewith (Figures 3 and 4). The ends of spindle 16 outside the body preferably carry knobs 23 to facilitate rotating the spindle.

The body, spindle and positioning lugs constitute a mounting means, the positioning lugs of which are adjustable to fit the gauge to different nominal sizes of recesses within a wide range. It is seen that rotation of bushings 15 adjusts the axial position of the whole assembly of bushings, spindle and positioning lugs, while rotation of the spindle adjusts the spacing between the two lugs. The first of the foregoing adjustments centers the lugs with respect to the gauge arm, hereinafter described. The second moves the lugs into engagement with the surfaces of recess R. During such movements these lugs are guided by engagement of their edges and lateral extensions 21 with the body.

Midway of its length body 12 carries a fixed transverse tubular barrel 24, the axis of which is in the plane of the bottom edges of the body. Preferably the barrel is supported from a bracket 25 fixed to the inside of the body. The top of the barrel is notched for passage of spindle 16 (Figure 2). A fitting 26 is rotatably mounted in the front end of the barrel co-axially therewith. This fitting has a diametric bore within which is mounted a gauge arm composed of inner and outer telescoping sections 27 and 28 respectively. The outer telescoping section is slidable within fitting 26 and is retained in adjusted position by a set screw 29, which is threadedly engaged in fitting 26 and journaled in the bore of barrel 24. Preferably a non-metallic filler 30 is interposed between the end of set screw 29 and the wall of the outer telescoping section 28 to prevent scarring the latter. The back end of the barrel has a counter-bore 31, which contains a compression spring 32 that bears between the set screw head and the barrel and thus retards rotation of the set screw and fitting 26. The set screw can be rotated relative to the fitting to loosen or tighten it against the gauge arm, but normally, when the gauge arm is rotated, both the set screw and fitting rotate with it within barrel 24.

A graduated scale 33 is fixed to the front of the outer telescoping section 28. The front face of fitting 26 has a reference mark 34 which is situated alongside said scale and in the same plane as the bottom edges of body 12 and the axis of barrel 24. For adjusting the gauge for a recess of any nominal radius, set screw 29 is loosened and the two telescoping sections of the gauge arm are moved as a unit with respect to fitting 26 until the reference mark 34 is aligned with the nominal radius on scale 33.

A meter 35 is fixed to the upper end of the outer telescoping section of the gauge arm. This meter has a dial graduated in both directions from a zero mark and a pointer 36 capable of reading in either direction from this zero mark. The inner telescoping section extends into this meter for actuating the pointer, the meter having any suitable known linkage for this purpose. The inner telescoping section has a free lower end that carries a rounded button 37 for contacting the surface of recess R. The meter contains a spring, not shown, which maintains button 37 in contact with the surface of the recess even though the dimension of the latter exceeds the dimension for which the gauge arm is set. When the gauge arm is adjusted properly with respect to the fitting and the barrel and pointer 36 reads zero, the distance from the barrel axis to the tip of the button equals the nominal radius of the recess. In practice the meter spring conveniently extends the inner telescoping section so that its normal position is about the maximum oversize tolerance and the pointer indicates this tolerance on the dial. When the gauge is applied to a recess at a region where the radius is exactly nominal, the inner telescoping section depresses and the pointer indicates zero.

In operation, bushings 15 are adjusted to place the positioning lugs 19 and 20 equidistant from the axis of barrel 24 about which the gauge arm is pivoted. The gauge arm is adjusted with respect to fitting 26 until reference mark 34 is opposite the nominal dimension (radius or diameter) of recess R. Gauge body 12 is place across recess R with its longitudinal axis at a right angle to that of the recess. Spindle 16 is rotated to move the positioning lugs into contact with the surface of the recess. With the gauge mechanism thus adjusted, the barrel axis coincides with the center of the arcuate recess and button 37 contacts the surface of the recess.

The gauge arm is rotated manually about the barrel axis so that button 37 traverses substantially the whole cross-section of the recess. Fitting 26 and set screw 29 rotate with the gauge arm within barrel 24. Wherever the recess has exactly the nominal dimension, pointer 36 is aligned with the zero mark on the meter dial. Wherever the recess has a radius greater or less than nominal, the inner telescoping section 27 moves radially with respect to the pivotal axis and in turn moves the pointer away from the zero mark to indicate the magnitude and the direction of the variation.

From the foregoing description, it is seen that the present invention provides a dimensional tolerance gauge of simple and rugged construction and one that furnishes an accurate indication of dimensional variations through substantially the whole cross-scetion of concave surfaces. The gauge is especially suited for furnishing these measurements in pipe upsetting dies, although obviously its use is not thus limited. For example, similarly constructed gauges may be utilized for measuring concave grooves in grooved rolls, bearings, molds and the like. For measuring such articles the bottom edges of the body are of course contoured to fit the article.

While we have shown and described only a single embodiment of the invention it is apparent that modifications may arise. Therefore, we do not wish to be limited to the disclosure set forth but only by the scope of the appended claims.

We claim:

1. A gauge which measures variations in the radius of concave surfaces whose cross section is approximately an arc of a circle of known nominal radius comprising an elongated body adapted to bridge the concave surface, a gauge arm composed of inner and outer telescoping sections, means on said body mounting said gauge arm for pivotal movement on an axis fixed with respect to said body, a pair of positioning lugs both of which are adjustable along the length of said body on opposite sides of said axis but remaining equidistant from said axis; and engageable with the edges of the concave surface for positioning the gauge with said axis coinciding with the center of the arc of the surface, said gauge arm being adjustable as a unit radially with respect to said axis to fit the gauge to concave surfaces of various nominal radii, the inner telescoping section of said gauge arm having a free end adapted to traverse the concave surface for moving this section radially with respect to said axis in response to variations in the radius of the surface from the nominal radius, and means carried by the outer telescoping section of said gauge arm and connected to the inner telescoping section for indicating such radial movement.

2. A gauge which measures variations in the radius of concave surfaces whose cross section is approximately an arc of a circle of known nominal radius comprising an elongated body adapted to bridge the concave surface, a gauge arm composed of inner and outer telescoping sections, means on said body mounting said gauge arm for pivotal movement with respect to said body, a longitudinal spindle having right and left hand screw threaded sections journaled in said body with its axis of rotation extending parallel with the elongated axis of the body, positioning lugs threadedly engaged with the threaded sections of said spindle and guided by said body and being engageable with the edges of the concave surface for positioning the gauge with the pivotal axis of said gauge arm coinciding with the center of the arc of the surface, said gauge arm being adjustable as a unit radially with respect to its pivotal axis to fit the gauge to concave recesses of various nominal radii, the inner telescoping section having a free end adapted to traverse the concave surface for moving this section radially in response to variations in the radius of the surface from the nominal radius, and means carried by the outer telescoping section of said gauge arm and connected to the inner telescoping section for indicating such radial movement.

3. A gauge which measures variations in the radius of concave surfaces whose cross section is approximately an arc of a circle of known nominal radius comprising an elongated body adapted to bridge the concave surface, a transverse barrel fixed in said body, a fitting rotatably mounted in an end of said barrel, a gauge arm composed of inner and outer telescoping sections carried by said fitting for adjustment as a unit radially with respect to the axis of rotation of the fitting, a set screw threadedly engaged with said fitting for fixing said gauge arm in said fitting, means for positioning said body with respect to the concave surface with the axis of rotation of the fitting concentric with the arc of the surface, the inner telescoping section of said gauge arm having a free end adapted to traverse the concave surface for moving this section radially with respect to the axis of rotation in response to variations in the radius of the surface from the nominal dimension, and means carried by the outer telescoping section of said gauge arm and connected to the inner telescoping section for indicating such radial movement.

4. A gauge which measures variations in the radius of concave surfaces whose cross section is approximately an arc of a circle of known nominal radius comprising an elongated body adapted to bridge the concave surface, transverse bearing means fixed in said body, a fitting rotatably mounted in said bearing means, a gauge arm composed of inner and outer telescoping sections carried by said fitting for adjustment as a unit radially with respect to the axis of rotation of said fitting, positioning lugs adjustable along the length of said body and engageable with the edges of the concave surface for positioning the gauge with the axis of rotation of the fitting concentric with the arc of the surface, the inner telescoping section of said gauge arm having a free end adapted to traverse the concave surface for moving this section radially with respect to the axis of rotation in response to variations in the radius of the surface from the nominal radius, and means carried by the outer telescoping section of said gauge arm and connected to the inner telescoping section for indicating such radial movement.

5. A gauge which measures variations in the radius of concave surfaces whose cross section is approximately an arc of a circle of known nominal radius comprising an elongated body adapted to bridge the concave surface, transverse bearing means fixed in said body, a fitting rotatably mounted in said bearing means, a gauge arm composed of inner and outer telescoping sections carried by said fitting for adjustment as a unit radially with respect to the axis of rotation of said fitting to set the gauge arm for concave surfaces of various nominal radii, a scale fixed on the outer telescoping section, said fitting having a reference mark cooperating with said scale for indicating the nominal radius of concave surface for which said gauge arm is set, positioning lugs adjustable along the length of said body and engageable with the edges of the concave surface for positioning the gauge with the axis of rotation of the fitting concentric with the arc of the surface, the inner telescoping section of said gauge arm having a free end adapted to traverse the concave surface for moving this section radially with respect to the axis of rotation in response to variations in the radius of the surface from the nominal dimension, and means carried by the outer telescoping section of said gauge arm and connected to the inner telescoping section for indicating such radial movement.

6. A gauge which measures variations in the radius of concave surfaces whose cross section is approximately an arc of a circle of known nominal radius comprising an elongated body the bottom edges of which form a supporting plane adapted to rest on a block with said body bridging a concave surface therein, transverse bearing means fixed in said body, a fitting rotatably mounted in said bearing means and being rotatable about an axis situated in said supporting plane, a gauge arm composed of inner and outer telescoping sections carried by said fitting for adjustment as a unit radially with respect to the axis of rotation of said fitting to set the gauge arm for concave surfaces of various nominal radii, a scale fixed on the outer telescoping section, said fitting having a reference mark in the same plane as its axis of rotation cooperating with said scale for indicating the nominal radius of concave surface for which said gauge arm is set, means for positioning said body with the axis of rotation of said fitting concentric with the arc of the concave surface, the inner telescoping section of said gauge arm having a free end adapted to traverse the concave surface for moving this section radially with respect to the axis of rotation in response to variations in the radius of the surface from the nominal radius, and means carried by the outer telescoping section of said gauge arm and connected to the inner telescoping section for indicating such radial movement.

7. A gauge which measures variations in the radius of concave surfaces whose cross section is approximately an arc of a circle of known nominal radius comprising a body adapted to bridge a concave surface, a gauge arm, means on said body mounting said gauge arm for pivotal movement on an axis fixed with respect to said body intermediate the length of the body, positioning means adjustable with respect to the length of said body but remaining equidistant from said axis for mounting said body over a concave surface with said axis coinciding with the center of the arc of the surface, said arm being formed of two telescoping sections radially adjustable as a unit with respect to said axis, one of said sections having a free end adapted to traverse the concave surface for moving this section radially with respect to said axis in response to variations in the radius of the surface from the nominal radius, and means carried by the other of said sections for indicating such radial movement.

8. A gauge which measures variations in the radius of concave surfaces whose cross section is approximately an arc of a circle of known nominal radius comprising an elongated body adapted to bridge the concave surface, a gauge arm composed of inner and outer telescoping sections, means on said body mounting said gauge arm for pivotal movement on an axis fixed with respect to said body intermediate the length of the body, positioning means adjustable with respect to the length of said body but remaining equidistant from said axis for mounting said body over a concave surface with said axis coinciding with the center of the arc of the surface, the effective radius of said gauge arm also being adjustable so that the gauge can fit concave surfaces of various nominal radii on adjustment of said positioning means and of the radius of said gauge arm, the inner telescoping section of said gauge arm having a free end adapted to traverse the concave surface for moving this section radially with respect to said axis in response to variations in the radius of the surface from the nominal radius, and means carried by the outer telescoping section of said gauge arm and connected to the inner telescoping section for indicating such radial movement.

ERNEST E. JOHNSON.
HARRY A. SIEFEN.

REFERENCES CITED

The following references are of record in the file of this patent:

UNITED STATES PATENTS

| Number | Name | Date |
|---|---|---|
| 918,378 | Saner | Apr. 13, 1909 |
| 979,248 | Ayers | Dec. 20, 1910 |
| 1,679,473 | Kabisius | Aug. 7, 1928 |
| 2,018,550 | Freeman et al. | Oct. 22, 1935 |
| 2,476,484 | Epler | July 19, 1948 |

FOREIGN PATENTS

| Number | Country | Date |
|---|---|---|
| 114,442 | Germany | Nov. 2, 1900 |